US010759640B2

(12) United States Patent
Collin et al.

(10) Patent No.: US 10,759,640 B2
(45) Date of Patent: Sep. 1, 2020

(54) PLATFORM TWIST DETECTION AND MITIGATION METHOD AND APPARATUS

(71) Applicant: Lippert Components Inc., Chicago, IL (US)

(72) Inventors: Matthew A. Collin, Ferndale, MI (US); Robert Ford, Troy, MI (US); John Manfreda, St. Clair Shores, MI (US)

(73) Assignee: Lippert Components, Inc., Mishawaka, IN (US)

( * ) Notice: Subject to any disclaimer, the term of this patent is extended or adjusted under 35 U.S.C. 154(b) by 396 days.

(21) Appl. No.: 15/803,097

(22) Filed: Nov. 3, 2017

(65) Prior Publication Data

US 2018/0127249 A1 May 10, 2018

Related U.S. Application Data

(60) Provisional application No. 62/551,331, filed on Aug. 29, 2017, provisional application No. 62/417,522, filed on Nov. 4, 2016.

(51) Int. Cl.
*B66F 7/20* (2006.01)
*B66F 7/12* (2006.01)
*B60S 9/02* (2006.01)
*G01B 7/30* (2006.01)

(52) U.S. Cl.
CPC .......... *B66F 7/20* (2013.01); *B60S 9/02* (2013.01); *B66F 7/12* (2013.01); *B66F 2700/123* (2013.01); *B66F 2700/126* (2013.01); *G01B 7/30* (2013.01); *G01B 2210/58* (2013.01)

(58) Field of Classification Search
CPC ....................................................... B66F 7/20

USPC ......................................................... 187/277
See application file for complete search history.

(56) References Cited

U.S. PATENT DOCUMENTS

| 5,915,700 | A | 6/1999 | Schneider et al. | |
| 6,768,936 | B2* | 7/2004 | Fiorletta | B60G 17/005 701/36 |
| 8,113,742 | B2* | 2/2012 | Kaarstad | E02B 17/08 405/196 |
| 10,400,464 | B2* | 9/2019 | Garceau | B66F 3/46 |
| 10,414,318 | B2* | 9/2019 | Valtanen | B60P 1/045 |
| 2004/0049330 | A1* | 3/2004 | Fiorletta | B60G 17/005 701/37 |
| 2007/0120350 | A1 | 5/2007 | Hiebert et al. | |
| 2009/0127531 | A1 | 5/2009 | Bakshi | |
| 2013/0164107 | A1* | 6/2013 | Pehlivan | B25J 17/0266 414/732 |

(Continued)

OTHER PUBLICATIONS

International Search Report and Written Opinion of the International Searching Authority for PCT/US2017/059920 filed on Nov. 3, 2017, dated Mar. 27, 2018.

*Primary Examiner* — David S Warren
(74) *Attorney, Agent, or Firm* — Reising Ethington P.C.

(57) ABSTRACT

A platform twist mitigation apparatus operable to extend jacks into engagement with a surface disposed below a platform carrying the jacks, and to alternately extend and retract the jacks to change platform attitude relative to the surface. Tilt sensors are supported at spaced locations on the platform. An electronic control module is programmed to detect a platform twist condition in response to angle data received from the tilt sensors and to mitigate the platform twist condition by operating or modifying the operation of the jacks.

20 Claims, 4 Drawing Sheets

(56) References Cited

U.S. PATENT DOCUMENTS

| | | | | |
|---|---|---|---|---|
| 2013/0309935 A1* | 11/2013 | Olson | .................. | A63H 3/20 |
| | | | | 446/330 |
| 2014/0219735 A1* | 8/2014 | Herzog | .................. | B61D 15/02 |
| | | | | 408/31 |
| 2018/0022325 A1* | 1/2018 | Garceau | .................. | B60S 9/02 |
| | | | | 180/41 |
| 2018/0111039 A1* | 4/2018 | Wood | .................. | A63C 17/12 |
| 2018/0127249 A1* | 5/2018 | Collin | .................. | B66F 7/20 |
| 2018/0223550 A1* | 8/2018 | Garceau | .................. | B66F 3/46 |
| 2018/0344559 A1* | 12/2018 | Hoel | .................. | B60B 33/0018 |
| 2019/0048603 A1* | 2/2019 | Garceau | .................. | B66F 3/46 |
| 2019/0159848 A1* | 5/2019 | Quaid | .................. | A61B 34/10 |

* cited by examiner

PLATFORM TWIST DETECTION AND MITIGATION METHOD AND APPARATUS

CROSS-REFERENCES TO RELATED APPLICATIONS

This application claims priority in U.S. Provisional Patent Application Ser. No. 62/417,522 filed Nov. 4, 2016, which is also incorporated herein in its entirety, by reference. This application also claims priority in U.S. Provisional Patent Application Ser. No. 62/551,331 filed Aug. 29, 2017, which is also incorporated herein in its entirety, by reference.

BACKGROUND

Platforms, such as vehicle frames, are subject to twisting, i.e., being forced into a condition in which the platform is no longer planar or otherwise in its normal configuration, e.g., the condition of a platform as it exists when no external forces are acting upon it. Platforms may experience twist when uneven loads are applied to various areas of the platform. For example, the frame of a recreational vehicle may twist as the vehicle is being leveled relative to earth gravity by a plurality of supporting jacks. The jacks may impart twist to a recreational vehicle frame when they are driven to displace, by differing amounts, respective portions of the frame they are supporting

SUMMARY

A platform twist mitigation apparatus is provided for detecting and mitigating twist in a platform such as a vehicle frame. The apparatus may comprise a plurality of jacks carried by a platform and operable to extend into engagement with a surface disposed below the platform, and independently operable to alternately extend and retract to change platform attitude relative to the surface. A first tilt sensor may be supported at a first location on the platform, a second tilt sensor supported at a second location on the platform spaced from the first location, and an electronic control module (ECM) programmed to detect a platform twist condition in response to angle data received from the first and second tilt sensors and to mitigate the platform twist condition by operating or modifying the operation of one or more jacks of the plurality of jacks.

In addition, a method is provided a method for detecting and mitigating twist in a platform. The method may include engaging a plurality of jacks with a bottom surface of a platform, supporting first and second tilt sensors at respective first and second spaced-apart locations on the platform, extending at least one of the plurality of jacks into engagement with a surface below the platform, detecting a platform twist condition in response to angle data received from the first and second tilt sensors, and mitigating the platform twist condition by modifying the operation of one or more jacks of the plurality of jacks.

A method is also provided for calibrating a platform twist mitigation apparatus. The method may comprise the steps of providing a plurality of jacks carried by a platform and operable to extend into engagement with a surface disposed below the platform and independently operable to change platform attitude relative to the surface and to change platform twist; providing a platform twist mitigation apparatus comprising a first tilt sensor supported at a first location on the platform, a second tilt sensor supported at a second location on the platform spaced from the first location, and an electronic control module (ECM) programmed to detect a platform twist condition in response to angle data received from the first and second tilt sensors and to mitigate the platform twist condition by operating or modifying the operation of one or more jacks of the plurality of jacks; changing platform twist to a desired platform twist value by operating the jacks as required to provide the desired platform twist value; and causing the ECM to enter a zero mode in which the ECM recognizes signal values currently being received from the tilt sensors as representing the desired platform twist value to be sought in future twist correction operations.

A method is also provided for calibrating a platform twist mitigation apparatus to recognize when the platform is within an acceptable range of platform twist values. The method may comprise the steps of providing a structure including jacks actuable to change the amount of platform twist and the attitude of the platform; providing a platform twist mitigation apparatus on the structure, the apparatus including an electronic control module (ECM) and tilt sensors, the ECM programmed to include a zero mode in which the ECM will recognize signal values being received from the tilt sensors as representing a platform twist value within a range of platform twist values that the ECM is to recognize as acceptable; providing the tilt sensors on the platform in positions where the ECM can measure platform twist by measuring the difference between in the tilt sensors' respective attitudes relative to gravity; limiting or supplementing jack extension or retraction during jack operations to minimize twist induced into the platform; and providing an input to the ECM indicating that the current set of signal values being received from the tilt sensors is the set of signal values that the ECM is to recognize as representing a desired platform twist value within a predetermined range of acceptable platform twist values for the ECM to reference in future platform twist mitigation operations.

DRAWING DESCRIPTIONS

These and other features and advantages will become apparent to those skilled in the art in connection with the following detailed description and drawings of one or more embodiments of the invention, in which.

DETAILED DESCRIPTION

The apparatus and method disclosed herein can be used to mitigate twist in various platforms, such as recreational vehicle frames, by using sensors to detect platform twist and to then mitigate the platform twist by operating jacks. Platform twist may be induced by uneven load distribution caused by forces applied to the platform by supported loads and/or by jacks actuated in a leveling process. For example, if a user of a recreational vehicle (RV) desires to level a kitchen countertop of an RV that includes a platform carrying a plurality of jacks, the user can operate the jacks to move the RV platform into a desired attitude in which the countertop is level. Tilt sensor signals corresponding to the desired platform attitude can be saved and, thereafter, if the countertop is out-of-level due to relocation of the RV or settling, a user can return the platform to the desired attitude (with the RV kitchen countertop level) by initiating an automatic leveling sequence that drives the RV platform back to the desired attitude. However, as the jacks drive the RV platform into the desired attitude, the jacks may induce twist into the RV platform. The apparatus and method provided herein can detect and continuously monitor such platform twist and, upon the determination that the platform twist exceeds a threshold value, can either initiate or modify jack operation to mitigate the platform twist.

Figure 1:
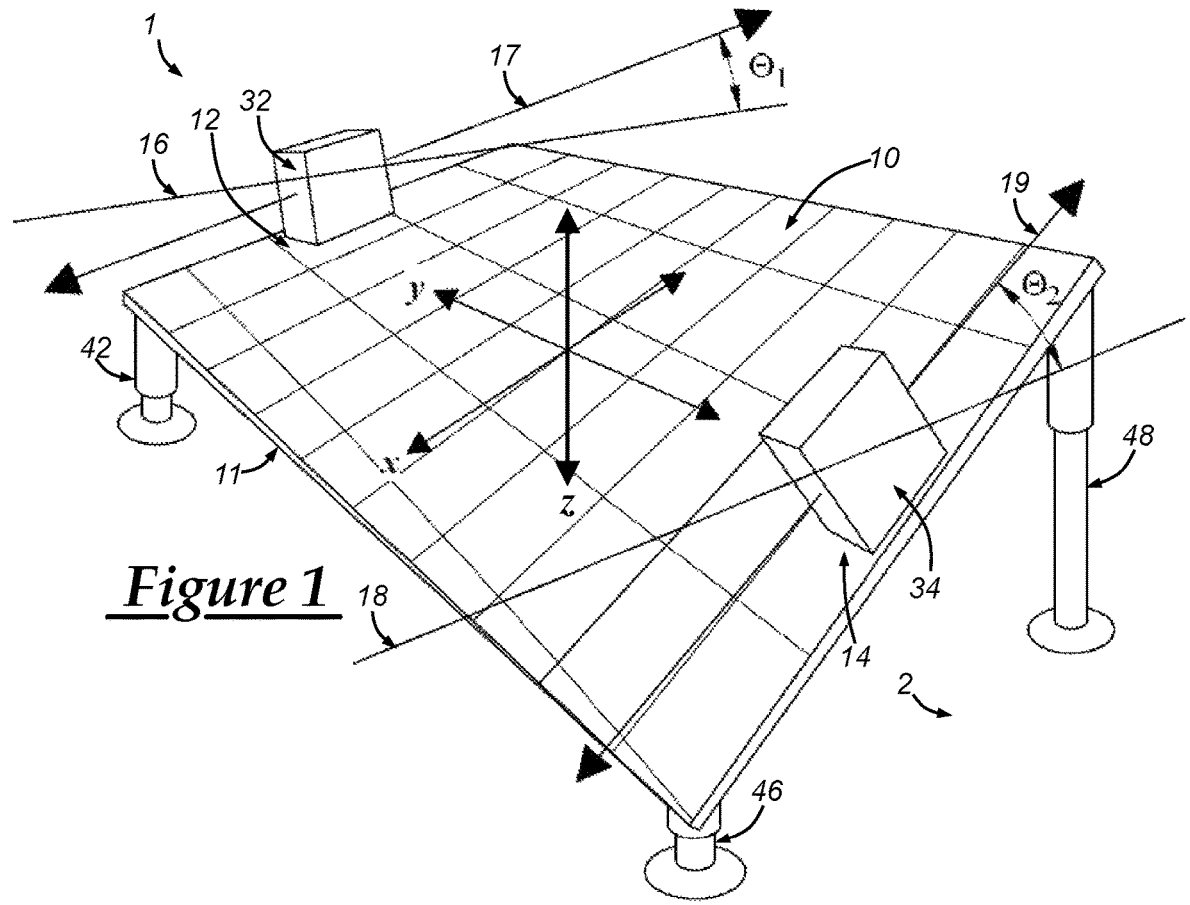
FIG. 1 is a perspective view of an illustrative embodiment of a platform twist mitigation apparatus in a twisted configuration.

With reference to FIG. 1, a platform twist mitigation apparatus 1 is provided for detecting and mitigating twist in a platform 10, such as a vehicle frame. The platform twist apparatus 1 may include a plurality of jacks 40 (42-48; jack 46 is underneath the right-rear corner of the platform and, thus, is not in view in FIG. 1) or may be retrofit to operate jacks already installed on a platform. The platform twist apparatus 1 may be operable to extend the jacks 42-48 into engagement with a surface 2, such as the ground, that is disposed below the platform 10, and may be independently operable to alternately extend and retract the jacks 42-48 to change platform attitude relative to the surface 2, such as changing the platform attitude from a twisted condition to a planar or normal, untwisted condition.

The platform mitigation apparatus 1 may also include a first tilt sensor 32 that is supported at a first location 12 on the platform 10 and a second tilt sensor 34 that is supported at a second location 14 on the platform 10 spaced from the first location 12. The tilt sensors 32, 34 may be constructed and/or programmed to detect, relative to the direction of earth's gravitational force, angles $\Theta_1$ and $\Theta_2$, respectively, between respective portions of the platform at the first location 12 and the second location 14 and a reference plane such as an earth gravity-level plane. The first angle $\Theta_1$ may be measured between a first gravity reference line 16 in the reference plane, and a first platform reference line 17 that runs along a platform surface between rear jacks 42 and 44. The second angle $\Theta_2$ may be measured between a second gravity reference line 18 in the reference plane, and second platform reference line 19 that runs along a platform surface between front jacks 46 and 48, as shown in FIG. 1. Also, tilt sensor signals representing the first angle $\Theta_1$ may be used to inform the ECM 50 of a platform attitude in the area of the first position 12 and tilt sensor signals representing the second angle $\Theta_2$ may be used to inform the ECM 50 of a platform attitude in the area of the second position 14.

Platform 10 may comprise any structure subject to twist and any suitable material or combination of materials, including metal and metal alloys (including steel and steel alloys), plastics and/or other polymers, and/or various other solid materials. Platform 10 can be a vehicle frame or base platform that is constructed from carbon steel, aluminum alloy, or other metal alloy or steel material. In addition, or alternatively, various plastics and/or polymers can be used, including polyethylene terephthalate (PET or PETE), high-density polyethylene (HDPE), polyvinyl chloride (PVC), polypropylene (PP), and various others. Although FIG. 1 depicts platform 10 as having a rectangular shape, the platform may include any one or more suitable shapes to include a frame or framework. Moreover, in some embodiments, the platform 10 may be or comprise a vehicle frame, e.g., the frame of a motor home or recreational vehicle or a recreational vehicle trailer.

Figure 3:
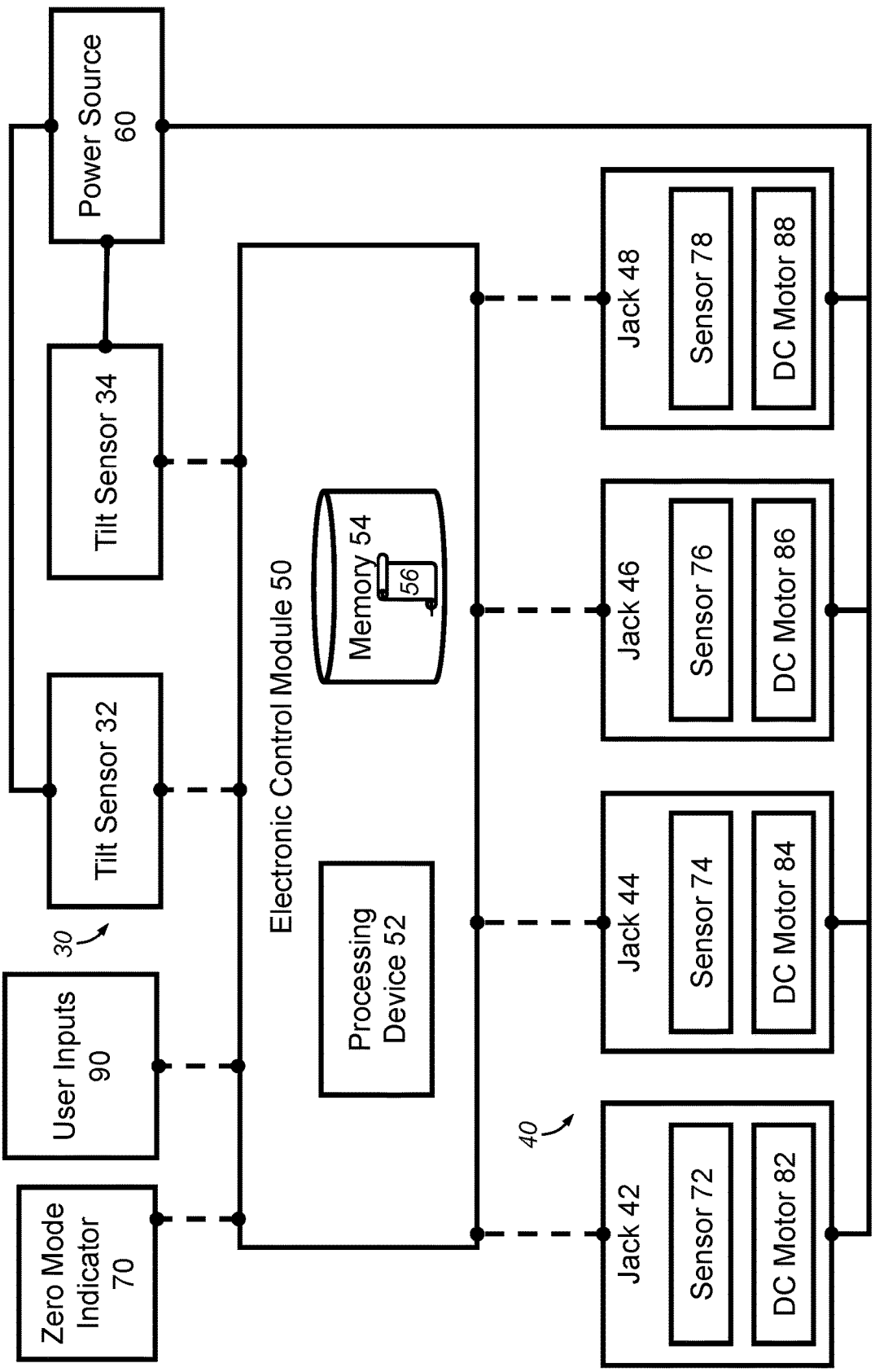
FIG. 3 is a schematic plan view of an illustrative embodiment of a platform twist mitigation apparatus.

FIG. 3 shows electronics 20 of the platform mitigation apparatus 1, including the plurality of jacks 40, the tilt sensors 32, 34, an electronic control module (ECM) 50, a power source 60, and input 90. The dashed lines represent data connections between the components to which the lines connect and the solid lines represent electronic power lines between the components to which the lines connect. The ECM 50 may include a non-transitory computer-readable memory that includes platform twist mitigation instructions that operate so as to mitigate and/or prevent platform twist. The platform twist mitigation instructions can be configured such that, when executed, the method 300 (FIGS. 4A-B) is carried out. Although the platform twist mitigation apparatus 1 is discussed below as including various components including the jacks and platform, the platform twist mitigation apparatus 1 may instead comprise sensor and electronic control components to be retrofit onto a platform and connected to jacks carried by the platform.

The plurality of jacks 40 can include four jacks 42-48 located at the corners of the platform 10. For example, jack 42 can be referred to as the left-rear jack, jack 44 can be referred to as the right-rear jack, jack 46 can be referred to as the left-front jack, and jack 48 can be referred to as the right-front jack.

Each jack 42-48 of the plurality of jacks 40 can be electronically operable and controlled by ECM 50 through sending jack control signals to each of the jacks 42-48. Each jack 42-48 can be any device that can extend or retract a piston or arm through use of, for example, pneumatic power and/or electric power. Moreover, the jacks 42-48 may be controllable relative to one another and, also, can be operable in sets, such as: a front jack pair that includes left-front jack 46 and right-front jack 48, a rear jack pair that includes left-rear jack 42 and right-rear jack 44, a left jack pair that includes left-rear jack 42 and left-front jack 46, and a right jack pair that includes right-rear jack 44 and right-front jack 48. As described in more detail below, the rear jack pair can be used to adjust the first angle $\Theta_1$ and the front jack pair can be used to adjust the second angle $\Theta_2$. In other embodiments, more tilt sensors can be placed on the platform 10 for use in twist detection and mitigation. For example, a third tilt sensor can be placed between left-rear jack 42 and left-front jack 46 and a fourth tilt sensor can be placed between right-rear jack 44 and right-front jack 48. In such an embodiment, the third sensor may be used to read a third angle $\Theta_3$ and the fourth sensor may be used to read a fourth angle $\Theta_4$.

Figure 2:
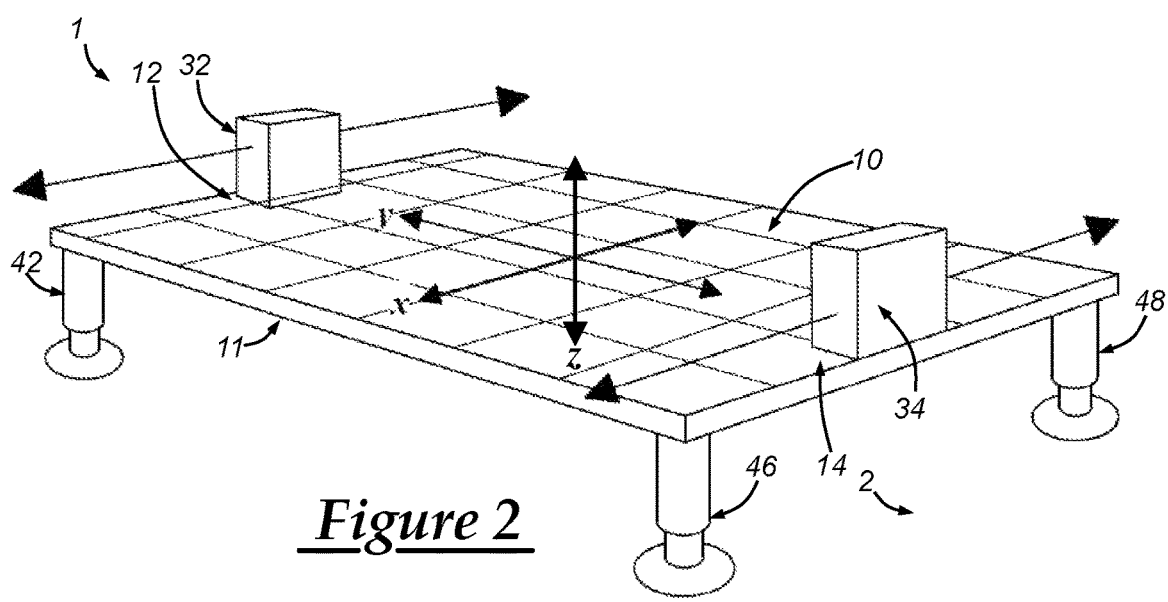
FIG. 2 is a perspective view of an illustrative embodiment of a platform twist mitigation apparatus in a non-twisted configuration.

Each jack 42-48 of the plurality of jacks 40 may include a position sensor 72-78 and a direct current motor 82-88. The position sensors 72-78 can be located and configured to sense the positions of jack piston or other jack component to determine the amount of jack extension in respective jacks 42-48. The DC motors 82-88 of each of the jacks 42-48 can be used to actuate their respective jacks between respective fully retracted positions and fully extended positions. For example, jack 42 may include a sensor 72 and a DC motor 82, jack 44 a sensor 74 and a DC motor 84, jack 46 a sensor 76 and a DC motor 86, and jack 48 a sensor 78 and a DC motor 88, as shown in FIG. 2. The jacks 42-48 may be configured to receive respective extension signals that command the jacks 42-48 to use their respective DC motors 82-88 to extend the jacks 42-48. Likewise, the jacks 42-48 may be configured to receive respective retraction signals that command the jacks to use their respective DC motors 82-88 to retract the jacks.

One or both of the tilt sensors 32, 34 shown in FIGS. 1-3 may also serve as tilt sensors whose outputs may be used by the ECM 50 to drive the attitude of the platform into a desired attitude. As used herein, the term "tilt sensor" refers to a sensor configured to detect tilt angle relative to earth gravity. Either sensor 32, 24 may be a dual axis tilt sensor configured to detect tilt about two orthogonal axes, e.g., pitch and roll, relative to earth gravity. In accordance with this tilt sensor function, one or both sensors 32, 34 may be configured to generate and provide digital and/or analog tilt sensor signals to the ECM 50. In the case of sending analog signals to the ECM 50, the ECM 50 may include an analog to digital converter to obtain sensor values in a digitized form.

The power source 60 may provide direct current or alternating current to the components of the platform mitigation apparatus 1. The power source 60 may include a battery, such as a lead-acid, lithium ion, or one or more of a variety of other types of batteries, including any of the various lithium or nickel based batteries known to those skilled in the art. Where alternating current (AC) is provided, the ECM 50 may include an AC/DC (alternating current/direct current) converter (i.e., rectifier). In some embodiments, the power source 60 may be included in a vehicle, such as a recreational vehicle, and, in such cases, the power source 60 may be coupled to an alternator that may derive power from a rotational force from a shaft that may be driven by an engine or motor, such as an internal combustion engine. In other embodiments, the power source 60 may be connected to an electric power line that is used to provide a means to receive electric power from a power plant or other power generating means. As shown in FIG. 1, the power source 60 may be used to provide electrical power to ECM 50, tilt sensors 32 and 34, and jacks 42-48.

User inputs 90 may include a plurality of human-machine interfacing devices and/or components. For example, user inputs 90 may include a plurality of pushbuttons, each of which may operate one of the plurality of jacks 40. Additionally, or alternatively, the user inputs 90 may include a touchscreen that includes a graphical user interface (GUI) and/or a microphone that can be used in conjunction with an automated speech recognition (ASR) system. Various other human-machine interfaces may be used.

The platform twist mitigation apparatus 1 may also include the ECM 50 which may be a micro controller-based electronic control module (ECM) (FIG. 3). The ECM 50 may include computer-readable platform twist mitigation instructions 56 (FIG. 3) that, when executed, cause the ECM 50 to detect a platform twist condition in response to receiving angle data from the first tilt sensor 32 and/or the second tilt sensor 34. The ECM 50 may additionally or alternatively be programmed to mitigate the platform twist condition by operating or modifying the operation of one or more jacks 42-48 of the plurality of jacks 40.

In one embodiment, the ECM 50 may be programmed to modify the operation of one or more of the jacks 42-48 by restricting the operation of one or more of the jacks 42-48. The ECM 50 may additionally or alternatively be programmed to restrict the operation of one or more of the jacks 42-48 by stopping or preventing the operation of one or more of the jacks 42-48 for a predetermined time period, or by slowing one or more of the jacks 42-48 for a predetermined time period, i.e. by scheduling the deceleration of jack extension or retraction and/or by scheduling a slower speed of jack extension or retraction.

In other embodiments, the ECM 50 may be programmed to differentially modify the operation of one or more of the jacks 42-48 by augmenting the operation of one or more of the jacks 42-48. The ECM 50 may be programmed to augment the operation of one or more of the jacks 42-48 by initiating the operation, e.g., the extension or retraction of one or more of the jacks 42-48 for a predetermined time period, or by speeding-up one or more of the jacks 42-48 for a predetermined time period, e.g., by scheduling the acceleration of jack extension or retraction and/or by scheduling a faster speed of jack extension or retraction.

Also, according to some embodiments, the ECM 50 may be programmed to adjust or modify jack operation in response to feedback, i.e., in response to changing angle data received from the first sensor 32 and/or the second sensor 34 during an untwisting process or a platform twist mitigation process. The ECM 50 may also be programmed to continue modifying jack operation under feedback control until the angle data received from the first tilt sensor 32 matches angle data received from the second tilt sensor 34, or at least until the first tilt sensor data and the second tilt sensor data indicate that the amount of twist, which can be interpreted as an absolute difference between $\Theta_1$ and $\Theta_2$ (amount of twist $\Theta_\Delta = |\Theta_1 - \Theta_2|$), is below a threshold amount or a maximum allowable amount $\Theta_{max}$—simply stated when $\Theta_\Delta < \Theta_{max}$.

The first sensor 32 and/or second sensor 34 may be constructed or configured to transmit, and the ECM 50 constructed to receive, angle data via electromagnetic energy. In other embodiments, the first sensor 32 and second sensor 34 may transmit angle data to the ECM 50 by any other suitable data transmission medium, with or without the use of wires or other suitable current paths. This may include the use of short-range wireless communication (SRWC) technologies, including Bluetooth™, Wi-Fi, ZigBee™, and other suitable SRWC technologies.

The first sensor 32 and/or second sensor 34 may be carried by the platform on opposite sides or opposite ends of the platform, such as at spaced apart positions 12 and 14 as shown in FIG. 1. The ECM 50 may be carried by the platform 10 on a front end of the platform along with one of the sensors, in which case a remote second sensor would be carried by the platform at an aft end of the platform.

The ECM 50 may be programmed to mitigate the platform twist condition while the jacks 42-48 are being operated to re-orient the platform 10 to a desired attitude such as gravity level, i.e., such as an attitude in which the platform is oriented perpendicular to the direction of gravitational force of Earth, or are being operated to otherwise adjust the attitude of the platform 10. To accomplish this, the ECM 50 may be programmed to actively restrict one or more of the jacks 42-48 "on the fly" while the jacks 50 are being operated to level or otherwise adjust the attitude of the platform 10. The ECM 50 may be programmed to restrict the operation of one or more of the jacks 42-48 by stopping or preventing the operation one or more of the jacks 42-48 for a predetermined time period, or by slowing one or more of the jacks 42-48 for a predetermined time period.

In addition, or alternatively, the ECM 50 may be programmed to mitigate platform twist during an automatic platform attitude adjustment operation by actively augmenting the operation of one or more of the jacks 42-48 "on the fly". Active augmentation may be accomplished by programming or configuring the ECM 50 to operate one or more of the jacks 42-48 by initiating the extension or retraction of one or more of the jacks 42-48 for a predetermined time period, or by speeding-up one or more of the jacks 42-48 for a predetermined time period, i.e., by scheduling the acceleration of jack extension or retraction and/or a faster speed of jack extension or retraction.

The ECM 50 may be programmed or configured to adjust its modification of jack operation, in response to feedback, e.g., in response to changing angle data received from the first sensor 32 and/or the second sensor 34 during the untwisting process. The ECM 50 may be programmed to continue this feedback-controlled jack operation modification until the angle data received from the first tilt sensor 32 matches angle data received from the second tilt sensor 34, or at least until the first angle $\Theta_1$ and the second angle $\Theta_2$ indicate that the amount of twist $\Theta_\Delta$ is below a threshold amount or a maximum allowable amount $\Theta_{max}$.

For calibration purposes, the ECM 50 may be programmed to enter a zero mode in which the ECM 50 recognizes signal values currently being received from the tilt sensors 30 as representing a desired platform twist value to be sought in future twist correction operations. These calibration signal values that are received from tilt sensors 30 may be saved in EEPROM or other memory 54. The ECM 50 may be programmed to enter the zero mode for calibration purposes when power from power supply 60 is first applied to the controller 50.

As mentioned above, the platform 10 may comprise a vehicle frame, e.g., the frame of a motor home or recreational vehicle or a recreational vehicle trailer. In practice, the detection and mitigation of twist in a platform such as a vehicle frame may be accomplished by first either providing a platform 10 carrying a plurality of jacks 40 or supporting a plurality of jacks 40 on a platform 10, the jacks being independently operable to extend into engagement with a surface 2 below the platform 10 and also being independently operable to alternately extend and retract to change platform attitude relative to the surface 2. A first angle or tilt sensor 32 and a second angle or tilt sensor 34 may then be supported at respective first and second locations 12, 14, on the platform 10 such that the sensors 32 and 34 are spaced apart—for example, at forward and aft ends of the platform 10. At least one, and preferably all jacks 42-48 of the plurality of jacks 40 may then be extended into engagement with a surface 2 below the platform 10. Any platform twist condition may then be mitigated by differentially modifying the operation of one or more jacks 42-48 of the plurality of jacks 40 by restricting and/or augmenting the operation of one or more of the jacks 42-48 as one or more of the jacks 42-48 are being operated to adjust the attitude of at least a portion of the platform 10 relative to the direction of the gravitational force of Earth.

A platform twist mitigation apparatus 1 comprising the ECM 50 and tilt sensors 30, as disclosed above, may be calibrated by first providing the apparatus 1 on platform 10, then changing platform twist to a desired platform twist value by operating the jacks 40 as required to provide the desired platform twist value, and then causing the ECM 50 to enter a zero mode in which the ECM 50 recognizes signal values currently being received from the tilt sensors 30 as representing a desired platform twist value to be sought in future twist correction operations. The desired platform twist value may preferably, but not necessarily, be a zero platform twist value. The ECM 50 may also be programmed to recognize the signal values currently being received from the tilt sensors 30 as also indicating that a selected portion of the platform is in a desired attitude to be sought in future platform attitude adjustment/twist correction operations.

The ECM 50 may be programmed to enter the zero mode when power is first applied to the ECM 50 via, for example, the power source 60. If so, entry of the ECM 50 into the zero mode may include applying electrical power to the platform twist mitigation apparatus 1 after having changed platform twist to a desired platform twist value.

The platform twist mitigation apparatus 1 may include a zero mode indicator 70 configured to indicate when the ECM 50 is in the zero mode and ready to receive tilt sensor signal values representing desired platform attitude and/or twist. If the apparatus 1 includes such a zero mode indicator 70, then entry of the ECM 50 into zero mode will cause the zero mode indicator to indicate to an operator that the ECM 50 is, in fact, in the zero mode and ready for calibration inputs.

The platform twist mitigation apparatus 1 may be calibrated to recognize when platform 10 is within an acceptable range of platform twist values, rather than recognizing only a single desired platform twist value. The ECM 50 may be programmed to include a zero mode in which the ECM 50 will recognize signal values being received from the apparatus tilt sensors 30 as indicating that a selected portion of the platform 10 is in a desired attitude and representing a platform twist value, e.g., a median platform twist value, within a range of platform twist values that the ECM 50 is to recognize as acceptable in future twist mitigation operations. In other words, when an input is provided to the ECM 50 indicating that the current set of signal values being received from the tilt sensors 30 is the set of signal values that the ECM 50 is to recognize as representing a desired platform twist value, the ECM 50 recognizes that desired twist value as being just one value within a predetermined range of acceptable platform twist values for the ECM 50 to reference in future platform twist mitigation operations. The ECM 50 may be programmed to center the predetermined range of acceptable platform twist values on the one desired platform twist value, and may, for example, be programmed to recognize as acceptable a range of platform twist values within plus or minus 0.25 degrees of the desired platform twist value.

The platform twist detection and mitigation apparatus 1 and method disclosed below allows for mitigation of platform twist "on-the-fly" at the same time that the platform is being leveled, and using the same jacks used to level the platform, as will be apparent from the description of method 300 below.

As mentioned above, FIG. 1 shows a perspective view of an illustrative embodiment of the platform twist mitigation apparatus 1 in a twisted configuration, and FIG. 2 shows a perspective view of an illustrative embodiment of a platform twist mitigation apparatus in a non-twisted configuration. FIGS. 1 and 2 will be used as a reference in describing the method 300 (FIGS. 4A-B) below.

Figure 4A:
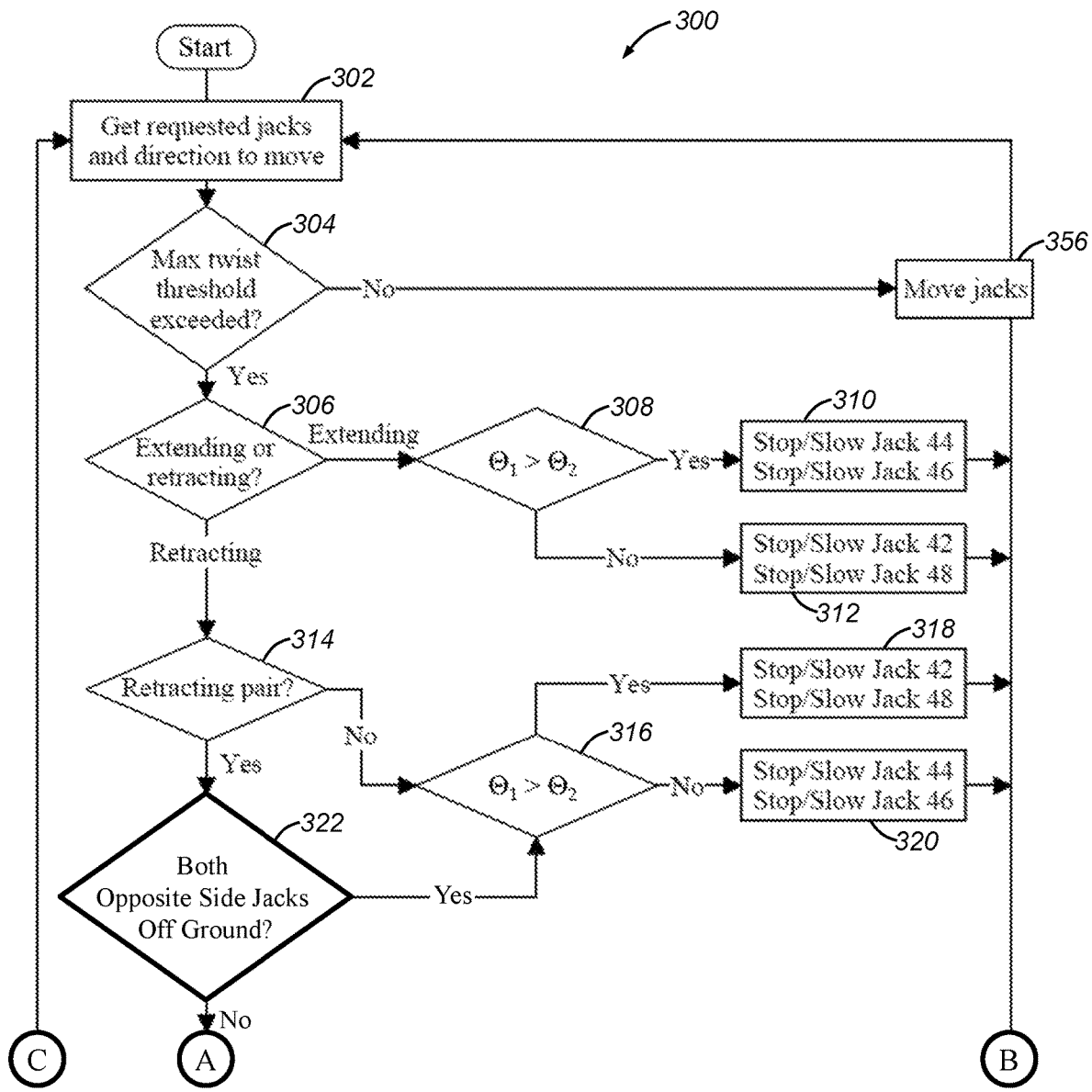
FIGS. 4A-B depict a flowchart illustrating an embodiment of a method of detecting and mitigating twist in a platform.
Figure 4B:
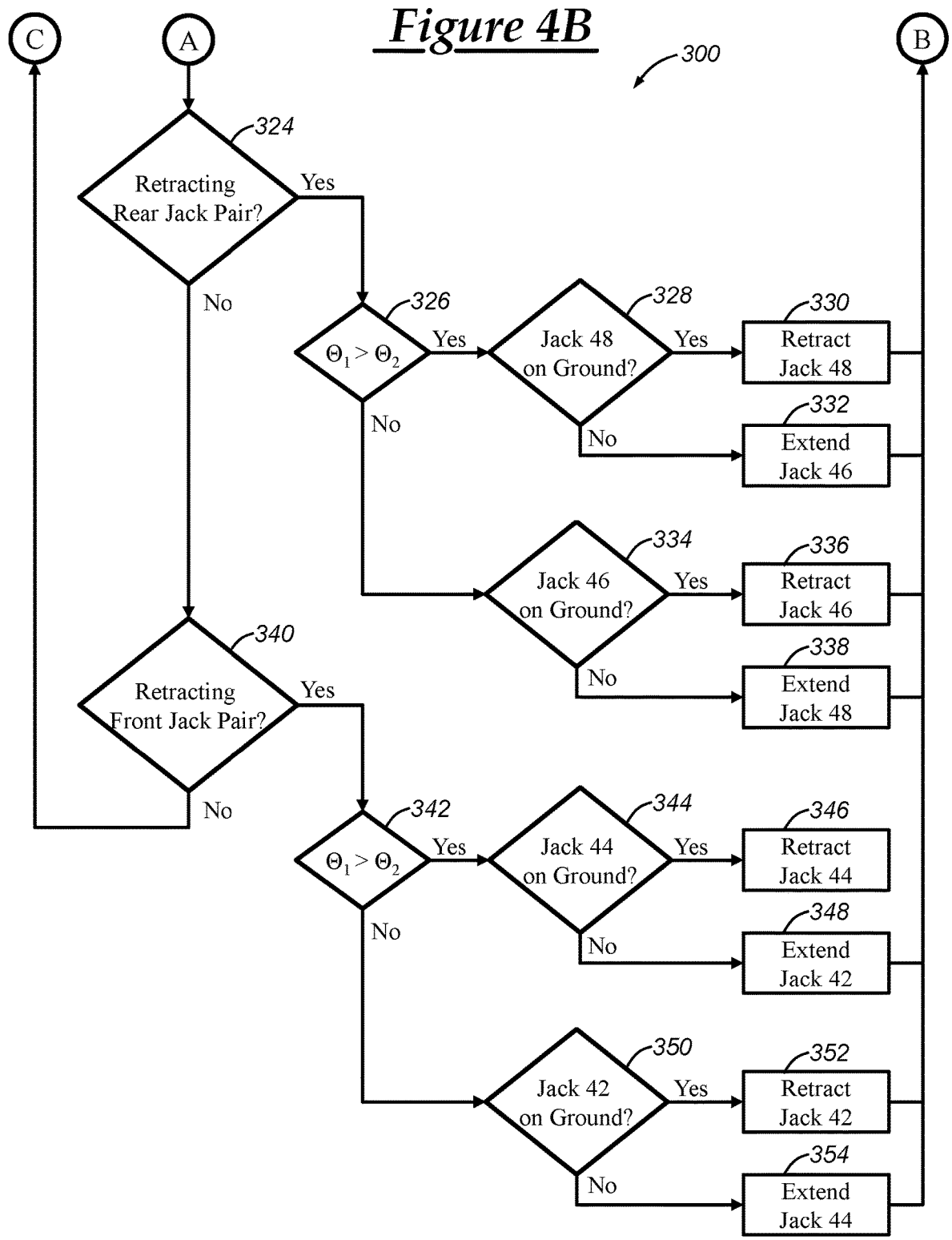

FIGS. 4A and 4B depict a flow chart showing a method 300 of detecting and mitigating twist in a platform. The method 300 may be carried out by the platform mitigation apparatus 1 through use of the ECM 50. The platform twist mitigation apparatus 1 may include platform twist mitigation instructions 56 that are stored in memory 54 and that may be executed by processing device 52. The platform twist mitigation instructions 56 may be executed upon the initiation of a platform attitude adjustment, e.g., a leveling process, in which the platform 10 is automatically re-oriented to a desired attitude, such as gravity level, using the ECM 50 to control jacks 42-48. During the leveling process, various factors may cause the platform to begin to twist (i.e., to begin to take on a platform twist condition). By using the platform twist mitigation instructions 56, which may be configured to implement the method 300 discussed below, platform twist imparted by the platform attitude adjustment process may be avoided and/or mitigated. In other embodiments, a user may operate jacks 42-48 manually and, during such operation, the platform twist mitigation instructions 56 may be executed such that platform twist is avoided and/or mitigated. The operation of jacks 42-48 and/or the initiation of the automatic platform attitude adjustment process may be performed through a user operating inputs 90, which may be entered via one or more pushbuttons, a touchscreen display, or other human-machine interface.

Method 300 begins with step 302 wherein the ECM 50 determines which one or more jacks 42-48 are requested or anticipated as being actuated or moved and, for each of the one or more jacks 42-48 that are requested or anticipated to be actuated or moved, the ECM 50 determines a direction in which the jack will move. For each of the one or more jacks 42-48 that are requested or anticipated to be actuated or moved, a present or anticipated speed, a present or anticipated acceleration, a present or anticipated jacking height or extension length, and/or various other parameters may be determined through receiving control signals from another electronic control module, obtaining control signals as part of an application stored in memory 54 of ECM 50, and/or obtained from sensors 72-78 included in jacks 42-48. At least once the requested jacks and their directions are determined or obtained, the method 300 can proceed to step 304.

In step 304, it is determined whether a max twist threshold $\Theta_{max}$ is exceeded. This step may include gathering sensor readings from a first tilt sensor 32 and a second tilt sensor 34 so as to measure a first angle $\Theta_1$ and a second angle $\Theta_2$, calculating a twist angle $\Theta_A$, and then comparing the twist angle to a max twist threshold $\Theta_{max}$. The twist angle $\Theta_A$ may be calculated as the absolute value of the difference between the first angle $\Theta_1$ and the second angle $\Theta_2$ such that $\Theta_A = |\Theta_1 - \Theta_2|$. The max twist value $\Theta_{max}$ may be recalled from memory 54 of the ECM 50, or may otherwise be received or obtained at the ECM 50. In one embodiment, the first angle $\Theta_1$ and the second angle $\Theta_2$ may be measured upon the method 300 reaching step 304. In other embodiments, a last measured value for both the first angle $\Theta_1$ and the second angle $\Theta_2$ may be obtained from, for example, memory 54 of the ECM 50. The receiving of sensor values from tilt sensors 32 and 34, the recall of last measured sensor values from memory 54, and/or the various calculations and logic included in this step may be carried out by processor 52 of the ECM 50. When $\Theta_A > \Theta_{max}$, then the method 300 proceeds to step 306; otherwise, the method 300 proceeds to step 356.

In step 306, it is determined whether the request is to extend the requested jack(s) or retract the requested jack(s). This determination may be made by using the processor 52 of the ECM 50 to inspect the obtained information from step 302 as to the direction in which each of the requested jacks are moving. In some embodiments, it may be determined whether the jacks are presently extended or retracting and, in other embodiments, it may be determined whether the request received (step 302) is to extend or retract the requested jack(s). In the case that the one or more requested jacks are extending or requested to be extended, the method 300 proceeds to step 308; otherwise, the method 300 proceeds to step 314.

In step 308, it is determined whether the first angle $\Theta_1$ that is measured by the first tilt sensor 32 is larger than the second angle $\Theta_2$ that is measured by the second tilt sensor 34. As mentioned above, the first sensor 32 may be positioned between the rear jacks (rear-left jack 42 and rear-right jack 44) and, thus, the first angle $\Theta_1$ may represent an angle that the rear portion of the platform forms relative to a gravity level plane. And, the second sensor 34 may be positioned between the front jacks (front-left jack 46 and front-right jack 48) and, thus, the second angle $\Theta_2$ may represent an angle that the front portion of the platform forms with a gravity level plane. The comparison of the first and second angles may be carried out by processor 52, which may receive the sensor signals representing the first angle $\Theta_1$ from the first sensor 32 and the second angle $\Theta_2$ from the second sensor 34 directly, or which may recall tilt sensor angle values from memory 54. In the latter case, the tilt sensor angle values that are recalled from memory may be the last measured tilt sensor angle values or may be an average tilt sensor angle value that is calculated based on a plurality of previously and/or recently obtained tilt sensor angle values from sensors 32 and 34. When it is determined that the first angle $\Theta_1$ from the first sensor 32 is greater than the second angle $\Theta_2$ from the second sensor 34, then the method 300 continues to step 310; otherwise, the method 300 continues to step 312.

In step 310, once it has been determined that the maximum twist threshold has been reached (step 304), that the requested jacks are to be extended (or are presently extending) (step 306), and that the rear portion of the platform 10 is inclined at a larger angle than the front portion of the platform 10 (step 308), then the right-rear jack 44 and/or the left-front jack 46 are stopped and/or slowed. In FIG. 1, the first angle $\Theta_1$ is smaller than the second angle $\Theta_2$ and, thus, in this scenario, the method would have proceeded to step 312, which is explained below. However, when the first angle $\Theta_1$ this larger than the second angle $\Theta_2$, then the right-rear jack 44 and/or the left-front jack 46 would be stopped and/or slowed as to not increase the twist of the platform 10. The method 300 continues to step 356.

In step 312, once it has been determined that the maximum twist threshold has been reached (step 304), that the requested jacks are to be extended (or are presently extending) (step 306), and that the first angle $\Theta_1$ is smaller than (or equal to) the second angle $\Theta_2$ (e.g., the rear portion of the platform 10 is inclined at a larger angle than the front portion of the platform 10) (step 308), then the left-rear jack 42 and/or the right-front jack 48 are stopped and/or slowed. For example, as shown in FIG. 1, if the right-front jack 48 were to be extended more, this would cause the difference between the first angle $\Theta_1$ and the second angle $\Theta_2$ to increase along with the amount of twist of platform 10. Thus, if there is a request to extend right-front jack 48, then, upon reaching step 310, the right front jack would be stopped and/or slowed. The method 300 continues to step 356.

In step 314, after it has been determined that the requested jack(s) are going to retract (or are presently retracting), it is determined whether a pair of jacks (as opposed to a single jack) has been requested to retract. In one embodiment, processing device 52 may determine which pair of jacks have been requested to be retracted and, based thereon, may determine whether the requested jacks constitute a pair, such as the rear jack pair (jacks 42 and 44), the front jack pair (jacks 46 and 48), the left jack pair (jacks 42 and 46), or the right jack pair (jacks 44 and 48). If a single jack has been requested to be retracted, then the method 300 continues to step 316; otherwise, the method 300 continues to step 322.

In step 316, it is determined whether the first angle $\Theta_1$ that is measured by the first tilt sensor 32 is larger than the second angle $\Theta_2$ that is measured by the second tilt sensor 34. This step is analogous to step 308, except that the outcome of this determination will result in different actions since, upon reaching step 316, the requested jack is to be retracted instead of extended, as is the case in step 308. For example, when it is determined that the first angle $\Theta_1$ is larger than the second angle $\Theta_2$, then the method 300 continues to step 318; otherwise, the method 300 continues to step 320.

In step 318, once it has been determined that the maximum twist threshold has been reached (step 304), that a single requested jack is to be retracted (step 306 and 314), and that the first angle $\Theta_1$ is larger than the second angle $\Theta_2$ (e.g., the rear portion of the platform 10 is inclined at a larger angle than the front portion of the platform 10) (step 316), then the left-rear jack 42 and/or the right-front jack 48 are stopped and/or slowed. This step is similar in nature to step 312 discussed above and, thus, can be carried out in a like manner. The method 300 continues to step 356.

In step 320, once it has been determined that the maximum twist threshold has been reached (step 304), that a single requested jack is to be retracted (step 306 and 314), and that the first angle $\Theta_1$ this less than (or equal to) the second angle $\Theta_2$ (e.g., the front portion of the platform 10 is inclined at a larger angle than the rear portion of the platform 10) (step 316), then the right-rear jack 44 and/or the left-front jack 46 are stopped and/or slowed. For example, as shown in FIG. 1, if the left-front jack 46 were to be retracted more as requested, this would cause the difference between the first angle $\Theta_1$ and the second angle $\Theta_2$ to increase along with the amount of twist of platform 10. Thus, if there is a request to extend left-front jack 46, then, upon reaching step 320, the left-front jack 46 would be stopped and/or slowed. However, if the right-front jack 48 were to be retracted more, this requested action would not be inhibited or prevented since the retraction of the right-front jack 48 would decrease the platform twist of platform 10. The method 300 continues to step 356.

In step 322, after it has been determined that there is a request to retract a pair of jacks, then it is determined whether both of the jacks of the other jack pair are in contact with the ground. For example, if the rear jack pair is requested to be moved, then it may be determined whether the jacks 46 and 48 of the front jack pair are in contact with surface 2. If both jacks are off the surface 2 (i.e., not in contact with the surface 2), then the method can proceed to step 316, which will result in stopping or slowing one of the jack pairs that are requested to be moved, while allowing the other jack of the requested jack pair to retract in the requested manner as to mitigate and/or reduce the twist of platform 10. Although method 300 does not distinguish between requesting a single jack to be extended and requesting a jack pair to be extended, those skilled in the art will appreciate that other embodiments of the method exist, such as a method similar to method 300, but that includes steps analogous to steps 314 to 354 that are modified to address situations in which the jacks are extended such that platform twist is mitigated. If one or both of the jacks of the other jack pair are in contact with the ground, the method 300 continues to step 324; otherwise, the method 300 continues to step 316.

In step 324, it is determined whether the rear jack pair (jacks 42 and 44) has been requested to be retracted. This step may be carried out by processing device 52 of ECM 50, which may determine which jacks are to be requested through evaluating user input that may be received according to any one or more embodiments discussed above with respect to step 302. In another embodiment, the requested jack information may be saved in memory 54 and, upon step 324 being reached, the requested jack information may be recalled and evaluated by processing device 52 of ECM 50. When it is determined that the rear jack pair has been requested to be retracted, the method 300 continues to step 326; otherwise, the method 300 continues to step 340.

In step 326, it is determined whether the first angle $\Theta_1$ that is measured by the first tilt sensor 32 is larger than the second angle $\Theta_2$ that is measured by the second tilt sensor 34. This step is analogous to step 308 and 316, except that the outcome of this determination will result in different actions as to mitigate or prevent further twist of the platform 10 according to the particular situation, which those skilled in the art will appreciate is different for steps 308, 316, and 326. When it is determined that the first angle $\Theta_1$ is larger than the second angle $\Theta_2$, then the method 300 continues to step 328; otherwise, the method 300 continues to step 334.

In step 328, it is determined whether the right-front jack 48 is on the ground. This can be determined through using various sensors, such as sensor 78 of jack 48, or may be determined by feedback information provided to ECM 50 that indicates the jack 48 can no longer extend. When it is determined that the right-front jack 48 is on the surface 2, the method 300 proceeds to step 330; otherwise, the method 300 proceeds to step 332.

In step 330, the right-front jack 48 is retracted. This may include generating a jack retraction signal using processing device 52 of ECM 50 and, subsequently, sending the jack retraction signal to the right-front jack 48. If there had been a request to extend the right-front jack 48, then this request can be disregarded. The method 300 continues to step 356.

In step 332, the left-front jack 46 is extended. This may include generating a jack extension signal using processing device 52 of ECM 50 and, subsequently, sending the jack extension signal to left-front jack 46. This step may include ignoring the request to retract the rear jack pair, and may also or alternatively include extending the left-front jack 46 while the rear jack pair is retracted. The method 300 continues to step 356.

In step 334, it is determined whether the left-front jack 46 is on the ground. This can be determined through using various sensors, such as sensor 76 of jack 46, or may be determined by feedback information provided to ECM 50 that indicates the jack 46 can no longer extend. When it is determined that the left-front jack 46 is on the surface 2, the method 300 proceeds to step 336; otherwise, the method 300 proceeds to step 338.

In step 336, the left-front jack 46 is retracted. This may include generating a jack retraction signal using processing device 52 of ECM 50 and, subsequently, sending the jack retraction signal to the left-front jack 46. If there had been a request to extend the left-front jack 46, then this request can be disregarded. The method 300 continues to step 356.

In step 338, the right-front jack 48 is extended. This may include generating a jack extension signal using processing device 52 of ECM 50 and, subsequently, sending the jack extension signal to right-front jack 48. Additionally, this step may include ignoring the request to retract the rear jack pair, and may also or alternatively include extending the right-front jack 48 while the rear jack pair is retracted. The method 300 continues to step 356.

In step 340, it is determined whether the front jack pair (jacks 46 and 48) has been requested to be retracted. This step may be carried out by the processing device 52 of the ECM 50, which may determine which jacks are to be requested through evaluating user input that can be received according to any one or more embodiments discussed above with respect to step 302. The requested jack information may be saved in memory 54 and, upon step 332 being reached, the requested jack information may be recalled and evaluated by processing device 52 of ECM 50. When it is determined that the rear jack pair has been requested to be retracted, the method 300 continues to step 342. Otherwise, the method 300 continues to step 302 where the requested jacks and requested directions may be obtained. For example, in one scenario, the platform mitigation apparatus 1 that is discussed in conjunction with method 300 may only permit the front jack pair or the rear jack pair to be operated and may not permit other jack pairs to be operated simultaneously. Thus, if it is determined that a jack pair is requested to be retracted (step 314), that the rear jack pair and the front jack pair are not the requested pair to be retracted (steps 324 and 340), then there may be an error in the determination of which jacks have been requested to be moved. Thus, the method 300 may proceed back to step 302 and, additionally, may notify the user using a human-machine interface that the requested jack actions are invalid.

In step 342, it is determined whether the first angle $\Theta_1$ that is measured by the first tilt sensor 32 is larger than the second angle $\Theta_2$ that is measured by the second tilt sensor 34. This step is analogous to steps 308, 316, and 326, with the exception that the outcome of this determination will result in different actions as to mitigate or prevent further twist of the platform 10 according to the particular situation, which those skilled in the art will appreciate is different for steps 308, 316, 326, and 342. When it is determined that the first angle $\Theta_1$ is larger than the second angle $\Theta_2$, then the method 300 continues to step 344; otherwise, the method 300 continues to step 350.

In step 342, it is determined whether the right-rear jack 44 is on the ground. This can be determined through using various sensors, such as sensor 74 of jack 44, or may be determined by feedback information provided to ECM 50 that indicates the jack 44 can no longer extend. When it is determined that the right-rear jack 44 is on the surface 2, the method 300 proceeds to step 346; otherwise, the method 300 proceeds to step 348.

In step 346, the right-rear jack 44 is retracted. This may include generating a jack retraction signal using processing device 52 of ECM 50 and, subsequently, sending the jack retraction signal to the right-rear jack 44. If there had been a request to extend the right-rear jack 44, then this request can be disregarded. The method 300 continues to step 356.

In step 348, the left-rear jack 42 is extended. This may include generating a jack extension signal using the processing device 52 of the ECM 50 and, subsequently, sending the jack extension signal to the left-rear jack 42. Additionally, at least in some embodiments, this step may include ignoring the request to retract the front jack pair; in other embodiments, the left-rear jack 42 may be extended while the front jack pair is retracted. The method 300 continues to step 356.

In step 350, it is determined whether the left-rear jack 42 is on the ground. This can be determined through using various sensors, such as sensor 72 of jack 42, or may be determined by feedback information provided to ECM 50 that indicates the jack 42 can no longer extend. When it is determined that the left-rear jack 42 is on the surface 2, the method 300 proceeds to step 352; otherwise, the method 300 proceeds to step 354.

In step 352, the left-rear jack 42 is retracted. This may include generating a jack retraction signal using processing device 52 of ECM 50 and, subsequently, sending the jack retraction signal to the left-rear jack 42. If there had been a request to extend the left-rear jack 42, then this request can be disregarded. The method 300 continues to step 356.

In step 354, the right-rear jack 44 is extended. This may include generating a jack extension signal using processing the device 52 of the ECM 50 and, subsequently, sending the jack extension signal to the right-rear jack 44. Additionally, at least in some embodiments, this step may include ignoring the request to retract the front jack pair; in other embodiments, the right-rear jack 44 may be extended while the front jack pair is retracted. The method 300 continues to step 356.

In step 356, the jack(s) are operated according to the requested operation (step 302) and according to the determined mitigation and/or preventative action (steps 310, 312, 318, 320, 330, 332, 336, 338, 346, 348, 352, and 354). For example, if the platform 10 were in the twisted state (i.e., experiencing a platform twist condition) as shown in FIG. 1 and there was a request to extend right-front jack 48, then the method would reach step 312, where it is determined to stop and/or slow the extension of right-front jack 48 such that the platform is not twisted further. At least in some embodiments, where the platform twist condition is met and only one jack is requested to be operated, when the requested operation of the jack worsens the platform twist condition, then the requested operation will be prevented. In situations where a pair of jacks are requested to be operated, a single jack of the jack pair may be slowed such that the other jack can catch up thereby reducing the degree of the platform twist condition. Examples are provided below that illustrate these points. After step 356 is carried out, the method 300 proceeds back to step 302, where the method 300 may be repeated again.

Thus, as discussed above, the platform twist mitigation apparatus 1 and method may be used to reduce platform twist of platform 10. For example, with reference to FIG. 1, if the user request that left-rear jack 42 be extended such that the left-rear corner of platform 10 is raised, then the twist of platform 10 would be worsened. Using method 300, it can be determined that the left-rear jack 42 has been requested to be extended (steps 302, 306), that the max twist threshold $\Theta_{max}$ has been exceeded ($\Theta_{max} < \Theta_A$) (step 304), and that the first angle $\Theta_1$ is smaller than (or equal to) the second angle $\Theta_2$ (step 308). Therefore, the left-rear jack 42 can be stopped so as to not worsen the twist of platform 10.

In another example, a user may request to extend the front jack pair. For illustrative purposes, it may be assumed that the platform 10 is in the twisted condition as shown in FIG. 1. Thus, the method 300 may be used to determine that the front jack pair has been requested to be extended (steps 302, 306), that the max twist threshold $\Theta_{max}$ has been exceeded ($\Theta_{max} < \Theta_A$) (step 304), and that the first angle $\Theta_1$ is smaller than (or equal to) the second angle $\Theta_2$ (step 308). Therefore, the right-front jack 42 can be stopped and/or slowed while still allowing the left-front jack 46 to extend so as to reduce the twist of platform 10.

In another embodiment, platform 10 may initially be in a leveled condition, such as that which is shown in FIG. 2. A user may request to move a jack pair, such as the right jack pair which includes right-rear jack 44 and right-front jack 48. Although the right-rear jack 44 and the right-front jack 48 may be requested to be moved in a like manner, due to an uneven distribution of load (or weight) on platform 10, one or more of the jacks may move faster or slower than the other. Thus, assuming a scenario where the right-front jack 48 extends faster than the right-rear jack 44, when the max twist threshold $\Theta_{max}$ has been exceeded ($\Theta_{max} < \Theta_A$) (step 304) due to the fact that the right-front jack 48 extended faster than the right-rear jack 44, the method 300 may proceed to step 312, which would cause the right-front jack 48 to stop while allowing the right-rear jack 44 to continue extending so that the right-rear jack 44 and the right-front jack 48 to be extended the same or similar amount. In other embodiments, the method 300 may cause the right-front jack 48 to slow down while allowing right-rear jack 44 to continue at the same initial speed so as to allow the right-rear jack 44 and the right-front jack 48 to be extended the same or similar amount.

Additionally, the method 300 may be modified so that, when a platform twist condition is detected, the ECM 50 generates one or more extension and/or retraction signals that can be sent to one or more jacks 42-48 so as to actively augment the operation of the jacks. Additionally, or alternatively, one or more of the jacks 42-48 can have its speed increased so that the platform twist can be mitigated.

Moreover, the method 300 may continuously be carried out such that the platform twist mitigation apparatus may continuously respond to changing platform attitude by, for example, determining whether the max twist threshold is exceeded. Various other scenarios and/or embodiments will be appreciated by those skilled in the art in light of the method 300 discussed above and the other operating principles of the platform twist mitigation apparatus 1 discussed herein.

This description, rather than describing limitations of an invention, only illustrates an embodiment of the invention recited in the claims. The language of this description is therefore exclusively descriptive and is non-limiting.

Obviously, it's possible to modify this invention from what the description teaches. Within the scope of the claims, one can practice the invention other than as described above.

What is claimed is:

1. A platform twist mitigation apparatus for detecting and mitigating twist in a platform such as a vehicle frame, the apparatus comprising:
    a plurality of jacks carried by a platform and operable to extend into engagement with a surface disposed below the platform, and independently operable to alternately extend and retract to change platform attitude relative to the surface;
    a first tilt sensor supported at a first location on the platform,
    a second tilt sensor supported at a second location on the platform spaced from the first location, and
    an electronic control module (ECM) programmed to detect a platform twist condition in response to angle data received from the first and second tilt sensors and to mitigate the platform twist condition by actively restricting and/or augmenting the operation of one or more jacks of the plurality of jacks by slowing the operation of a first lack of the one or of lacks to a non-zero speed and/or by speeding the operation of a second lack of the one or of lacks from a non-zero speed.

2. A platform twist mitigation apparatus as defined in claim 1 in which the ECM is programmed to mitigate the platform twist condition while at least one of the plurality of jacks are being operated to adjust the attitude of the platform.

3. A platform twist mitigation apparatus as defined in claim 1 in which the ECM is programmed to actively restrict the first jack the plurality of jacks are being operated to adjust the attitude of the platform.

4. A platform twist mitigation apparatus as defined in claim 3 in which the ECM is programmed to restrict the operation of at least one of the one or more jacks by stopping the at least one jack.

5. A platform twist mitigation apparatus as defined in claim 3 in which the ECM is programmed to restrict the operation of the one or more jacks by slowing the first jack to the non-zero speed.

6. A platform twist mitigation apparatus as defined in claim 1 in which the ECM is programmed to actively augment the operation of the one or more jacks.

7. A platform twist mitigation apparatus as defined in claim 6 in which the ECM is programmed to actively augment the operation of at least one of the one or more jacks by initiating the operation of the at least one jack.

8. A platform twist mitigation apparatus as defined in claim 6 in which the ECM is programmed to actively augment the operation of the one or more jacks by speeding the second jack.

9. A platform twist mitigation apparatus as defined in claim 2 in which the ECM is programmed to adjust jack operation modification in response to changing angle data received from the first and second sensors.

10. A platform twist mitigation apparatus as defined in claim 1 in which the ECM is programmed to enter a zero mode in which the ECM recognizes signal values currently being received from the tilt sensors as representing a desired platform twist value to be sought in future twist correction operations.

11. A platform twist mitigation apparatus as defined in claim 10 in which the ECM is programmed to enter the zero mode when power is first applied to the controller.

12. A method for detecting and mitigating twist in a platform by:
    positioning a plurality of jacks at respective spaced-apart locations between a platform and a surface below the platform;
    supporting first and second tilt sensors at respective first and second spaced-apart locations on the platform;
    extending at least one of the plurality of jacks into engagement with the surface below the platform;
    detecting a platform twist condition in response to angle data received from the first and second tilt sensors; and
    mitigating the platform twist condition by actively restricting and/or augmenting the operation of one or more jacks of the plurality of jacks by slowing the operation of a first lack of the one or of lacks to a non-zero speed and/or by speeding the operation of a second lack of the one or of lacks from a non-zero speed.

13. The method of claim 12 in which the step of mitigating the platform twist condition includes restricting the operation of the first jack as another one of the plurality of jacks is being operated to adjust the attitude of at least a portion of the platform.

14. The method of claim 12 in which the step of mitigating the platform twist condition includes augmenting the operation of the second jack as another one of the plurality of jacks is being operated to adjust the attitude of at least a portion of the platform.

15. A method for calibrating a platform twist mitigation apparatus; the method comprising the steps of:
    providing a plurality of jacks carried by a platform and operable to extend into engagement with a surface disposed below the platform and independently operable to change platform attitude relative to the surface and to change platform twist;
    providing a platform twist mitigation apparatus comprising a first tilt sensor supported at a first location on the platform, a second tilt sensor supported at a second location on the platform spaced from the first location, and an electronic control module (ECM) programmed to detect a platform twist condition in response to angle data received from the first and second tilt sensors and to mitigate the platform twist condition by operating or modifying the operation of one or more jacks of the plurality of jacks;

changing platform twist to a desired platform twist value by operating the jacks as required to provide the desired platform twist value; and causing the ECM to enter a zero mode in which the ECM recognizes signal values currently being received from the tilt sensors as representing the desired platform twist value to be sought in future twist correction operations, wherein the ECM is configured to determine whether a present platform twist value is within a range of acceptable platform twist values, and the range of acceptable platform twist values includes the desired platform twist value.

16. The method of claim 15 in which:
the step of providing a platform twist mitigation apparatus includes providing the ECM programmed to enter the zero mode when power is first applied to the controller;
the step of causing the ECM to enter the zero mode includes applying electrical power to the platform twist mitigation apparatus; and
the step of changing platform twist to the desired platform twist value is executed before the step of causing the ECM to enter the zero mode.

17. The method of claim 15 in which:
the step of providing the platform twist mitigation apparatus includes providing a zero mode indicator; and
the step of causing the ECM to enter the zero mode includes causing the zero mode indicator to indicate that the ECM is in the zero mode.

18. A method for calibrating a platform twist mitigation apparatus to recognize when the platform is within an acceptable range of platform twist values; the method comprising the steps of:
providing a structure including a platform and jacks actuable to change the amount of platform twist and the attitude of the platform;

providing a platform twist mitigation apparatus on the structure, the apparatus including an electronic control module (ECM) and tilt sensors, the ECM programmed to include a zero mode in which the ECM will recognize signal values being received from the tilt sensors as representing a platform twist value within a range of platform twist values that the ECM is to recognize as acceptable;

providing the tilt sensors on the platform in positions where the ECM can measure platform twist by measuring the difference between in the tilt sensors' respective attitudes relative to gravity;

limiting or supplementing jack extension or retraction during jack operations to minimize twist induced into the platform; and providing an input to the ECM indicating that the current set of signal values being received from the tilt sensors is the set of signal values that the ECM is to recognize as representing a desired platform twist value within a predetermined range of acceptable platform twist values for the ECM to reference in future platform twist mitigation operations, wherein the predetermined range of acceptable platform twist values includes the desired platform twist value.

19. The method of claim 18 in which:
the step of providing a platform twist mitigation apparatus includes programming the ECM to enter the zero mode when power is first applied to the ECM; and
an additional step of applying electrical power to the ECM is performed before the step of providing an input to the ECM.

20. The method of claim 18 in which the step of providing a platform twist mitigation apparatus includes providing an indicator and programming the ECM to indicate through the indicator when the ECM is in the zero mode.

\* \* \* \* \*

UNITED STATES PATENT AND TRADEMARK OFFICE
CERTIFICATE OF CORRECTION

PATENT NO. : 10,759,640 B2  
APPLICATION NO. : 15/803097  
DATED : September 1, 2020  
INVENTOR(S) : Matthew A. Collin, Robert Ford and John Manfreda Page 1 of 1

It is certified that error appears in the above-identified patent and that said Letters Patent is hereby corrected as shown below:

In the Claims

In Column 15, Line 47 -- change lack to jack

In Column 15, Line 49 -- change lacks to jacks

In Column 15, Line 58 -- after the word jack, insert the word --while--

In Column 16, Line 40 -- change lack to jack

In Column 16, Line 42 -- change lacks to jacks

In Column 18, Line 11 -- delete the word "in"

Signed and Sealed this  
Twenty-fourth Day of November, 2020

Andrei Iancu  
*Director of the United States Patent and Trademark Office*